Nov. 17, 1953  H. ANDERSON ET AL  2,659,639
PISTON RING ASSEMBLY AND RING SUPPORT AND EXPANDER MEMBER
Filed April 29, 1952
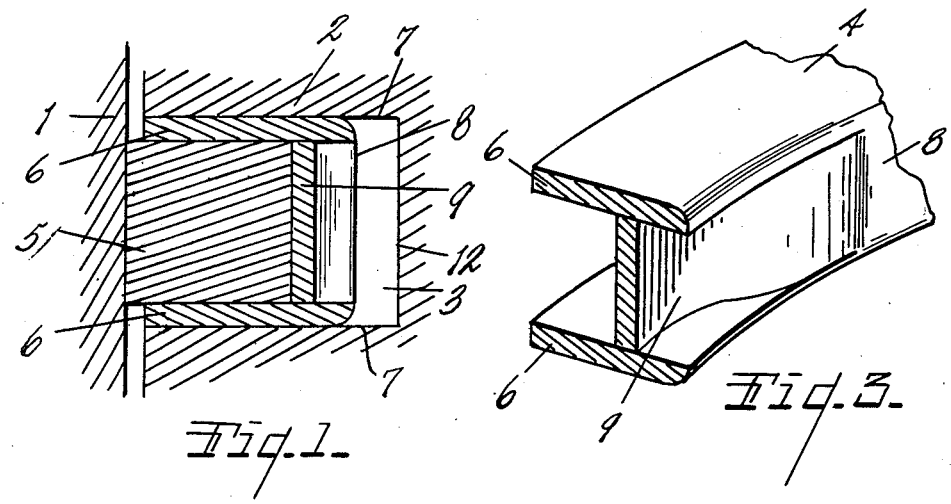
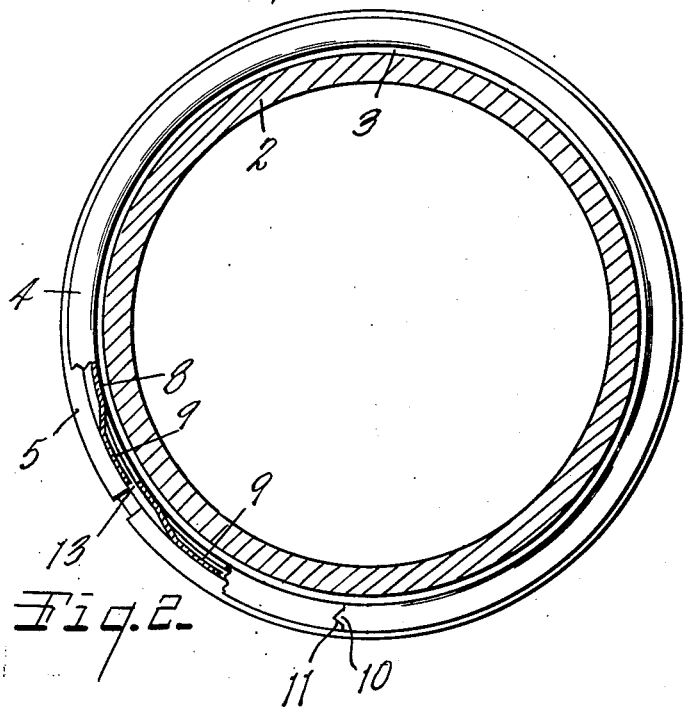
INVENTORS.
Hugo F. Anderson
Harold P. Phillips
by Otto A. Earl
Attorney Patented Nov. 17, 1953

2,659,639

UNITED STATES PATENT OFFICE 2,659,639

PISTON RING ASSEMBLY AND RING SUPPORT AND EXPANDER MEMBER

Hugo Anderson and Harold P. Phillips, Hastings, Mich., assignors to Hastings Manufacturing Company, Hastings, Mich.

Application April 29, 1952, Serial No. 284,916

8 Claims. (Cl. 309—29)

This invention relates to improvements in piston ring assemblies and ring support and expander members.

The main objects of this invention are:

First, to provide a piston ring assembly which may be successfully used in piston ring grooves of a depth exceeding that for which the piston ring unit of the assembly was originally designed.

Second, to provide a combined support and expander member for piston rings which is adapted to be installed in a piston ring groove of a depth exceeding that for which the piston ring was designed, and which effectively supports and expands the ring installed therein.

Objects relating to details and economies of the invention will appear from the description to follow. The invention is defined and pointed out in the claims.

A preferred embodiment of the invention is illustrated in the accompanying drawing in which:

Fig. 1 is a longitudinal section of a piston and coacting cylinder which are shown conventionally with the piston ring assembly of our invention installed therein.

Fig. 2 is a fragmentary elevational view of the piston ring assembly of our invention installed in a piston ring, the piston being shown conventionally and in transverse section through the groove.

Fig. 3 is an enlarged fragmentary perspective view of the combined support and expander member of our invention.

In the accompanying drawing we have not attempted to show the parts in their relative proportion or the commercial clearances and tolerances thereof. Further, the piston ring is conventionally illustrated, as different types of piston rings may be used as will appear from the description to follow.

It is a matter of common experience that piston ring grooves vary greatly in depth, particularly in some of the later models of motor vehicle engines. Original installation piston rings are designed for the particular grooves in which they are used. One of the main objects of our invention is to provide a piston ring assembly which enables the effective installation of a so-called replacement ring or ring assembly in such piston ring grooves, or in grooves of a depth exceeding that for which such replacements were designed and thus to enable standardization of such rings and ring assemblies.

In the accompanying drawing 1 represents a cylinder and 2 a piston having a piston ring groove 3 therein. The piston ring assembly of our invention comprises the split annular combined support and expander member designated generally by the numeral 4 which is adapted to be disposed in a piston ring groove for supporting a piston ring or ring assembly. The piston ring 5 illustrated is a conventional compression ring. The member 3 is formed of ductile metal of uniform thickness desirably about .015. This member is of outwardly facing channel section, the flanges 6 thereof being in side-by-side axial supported relation to the side walls 7 of the groove. The peripheral edges of the flanges are within the walls of the groove. The web 8 of the member 4 has a plurality of angularly spaced tongues 9 struck radially outward therefrom, one end of each tongue being free and the other end integrally joined to the web 8. The piston ring 5 is disposed between the flanges in supported engagement with these spring tongues so that the member 4 constitutes a combined support and expander member. The ends of the split support and expander member are in abutting supported relation and one end is preferably provided with a tongue 10 and the other with a notch 11 as shown in Fig. 2, preventing radial slippage of the ends relative to each other. The diameter of the member 4 substantially exceeds the diameter of the groove at the bottom 12 thereof so that the member 4 is supported in radially spaced relation to the bottom of the groove as is shown in Fig. 1. The piston ring 5 is of the split type and is springably expansible, the ring illustrated being a compression ring. An oil ring, that is a ring provided with drainage for oil or an oil ring assembly such as is shown in the Phillips Patent 2,565,042, issued August 21, 1951, may be used, although, of course, the expander of that assembly would be omitted.

When the member 4 is disposed within a piston ring groove with its ends in abutting supporting relation to each other it results in effect in a new ring groove. The members 4 are designed to receive ring elements of such radial width as would adapt them to piston ring grooves of the depth for which they were initially designed. The combined support and expander member eliminates the use of a separate expander spring, and provides an effective expander without regard to the depth of the groove, that is, if the groove is of sufficient depth to receive the assembly of our present invention.

The combined support and expander member of our present invention is desirable for use in re-grooved pistons. The flanges receive the wear of the piston ring instead of the side walls of the groove.

Where the member 4 is used with an oil ring the openings 13 in the web resulting from striking up of the tongues 9 providing the desired oil drainage.

We have not illustrated the various types of rings that may be used in combination with our combined support and expander member as it is believed that this disclosure will enable those skilled in the art to embody or adapt my invention as may be desired.

It should be understood that the accompanying drawings are largely illustrated and conventionalized for convenience in illustration.

Having thus described the invention what is claimed as new and desired to secure by Letters Patent is:

1. In a piston ring assembly the combination of a split annular combined support and expander members of outwardly facing channel section comprising spaced flanges and an integral web connecting their inner edges and adapted to be disposed in a piston ring groove in radially spaced relation to the bottom thereof and with its ends in abutting mutually supporting relation and with its flanges in axial supported relation to the side walls of the groove and with their peripheral edges within the side walls of the groove, the web of the member having a plurality of angularly spaced integral spring piston ring supporting tongues struck radially outward therefrom, the tongues being free at one end and integrally joined to the web at the other and being of a width approximating the distance between the flanges, and a split resilient expansible cylinder wall contacting element disposed between the flanges in axial supported relation to the flanges and in radial supported relation to said spring tongues.

2. In a piston ring assembly the combination of a split annular combined support and expander member of outwardly facing channel section comprising spaced flanges and an integral web connecting their inner edges and adapted to be disposed in a piston ring groove in radially spaced relation to the bottom thereof and with its ends in abutting mutually supporting relation and with its flanges in axial supported relation to the side walls of the groove, the web of the member having a plurality of angularly spaced integral spring tongues struck radially outward therefrom, the tongues being free at one end and integrally joined to the web at the other, and a split resilient expansible cylinder wall contacting element disposed between the flanges in axial supported relation to the flanges and in radial supported relation to said tongues.

3. In a piston ring assembly the combination of a split annular combined support and expander member of outwardly facing channel section comprising spaced flanges and an integral web connecting their inner edges and adapted to be disposed in a piston ring groove in radially spaced relation to the bottom thereof and with its ends in abutting mutually supporting relation and with its flanges in axial supported relation to the side walls of the groove, the web of the member having a plurality of angularly spaced springable tongues formed integrally therewith, and a split resilient expansible cylinder wall contacting element disposed between the flanges in radial supported relation to said tongues.

4. In a piston ring assembly the combination of a split annular combined ring support and expander member adapted to be disposed in a piston ring groove in radially spaced relation to the bottom thereof and with its ends in abutting mutually supporting relation and with its sides in axial supported relation to the side walls of the groove, the member having a plurality of angularly spaced integral spring tongues struck radially outward therefrom, and a split resilient expansible cylinder wall contacting element disposed in radial supported relation to said spring tongues.

5. As an article of manufacture, a split annular combined support and expander member of outwardly facing channel section comprising spaced flanges and an integral web connecting their inner edges and adapted to receive a piston ring and to be disposed in a piston ring groove in radially spaced relation to the bottom thereof and with its ends in abutting mutually supporting relation and with its flanges in axial supported relation to the side walls of the groove, the web of the member having a plurality of angularly spaced integral springable piston ring expander tongues struck radially outward therefrom, the tongues being free at one end and integrally joined to the web at the other.

6. As an article of manufacture, a split combined support and expander member of outwardly facing channel section comprising spaced flanges and an integral web connecting their inner edges and adapted to receive an expansible piston ring between its flanges and to be disposed in a piston ring groove in radially spaced relation to the bottom thereof and with its ends in abutting mutually supporting relation and with its flanges in axial supporting relation to the side walls of the groove, said member being formed of ductile metal of uniform thickness of .015 of an inch, the web of the member having a plurality of angularly spaced springable tongues struck outwardly therefrom for yieldably supporting a piston ring element disposed between the flanges.

7. A split annular combined piston ring support and expander member of outwardly facing channel section comprising spaced flanges and an integral web connecting their inner edges and adapted to receive an expansible piston ring between its flanges and to be disposed in a piston ring groove in radially spaced relation to the bottom thereof and with its ends in abutting mutually supporting relation and with its flanges in axial supported relation to the side walls of the groove, the web of the member having a plurality of angularly spaced springable piston ring expanding tongues formed integrally therewith.

8. As an article of manufacture, a split annular combined support and expander member formed of ductile metal of uniform thickness adapted to be disposed in a piston ring groove in spaced relation to the bottom thereof and with its ends in abutting relation and in radially spaced relation to the bottom of the groove, the member having a plurality of angularly spaced integral springable piston ring expanding tongues struck radially outwardly therefrom.

HUGO ANDERSON.
HAROLD P. PHILLIPS.

References Cited in the file of this patent

UNITED STATES PATENTS

| Number | Name | Date |
| --- | --- | --- |
| 2,297,104 | Johnson | Sept. 29, 1942 |
| 2,302,959 | Johnson | Nov. 24, 1942 |
| 2,596,286 | Phillips | May 13, 1952 |